April 9, 1940.   D. E. HOOKER   2,196,730
FILM PLAYING PHONOGRAPH
Filed May 17, 1938   6 Sheets-Sheet 1

Inventor
Donald E. Hooker
By [signature]
Atty.

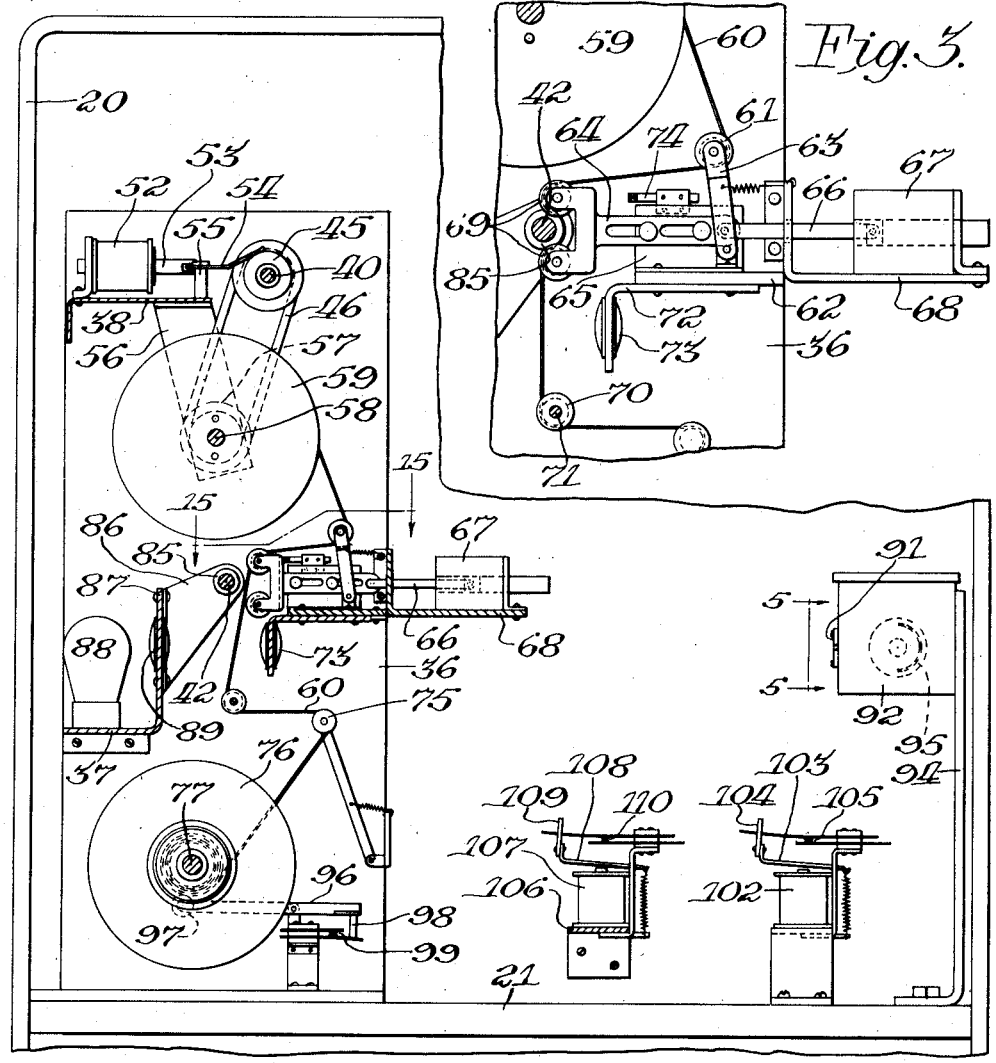

April 9, 1940. D. E. HOOKER 2,196,730
FILM PLAYING PHONOGRAPH
Filed May 17, 1938 6 Sheets-Sheet 3

Inventor
Donald E. Hooker
By Paul O. Pippel
Atty.

April 9, 1940.   D. E. HOOKER   2,196,730
FILM PLAYING PHONOGRAPH
Filed May 17, 1938   6 Sheets-Sheet 4

Inventor
Donald E. Hooker
By Paul O. Pippel
Atty.

April 9, 1940.　　　D. E. HOOKER　　　2,196,730
FILM PLAYING PHONOGRAPH
Filed May 17, 1938　　　6 Sheets-Sheet 5

Inventor
Donald E. Hooker
By [signature]
Atty.

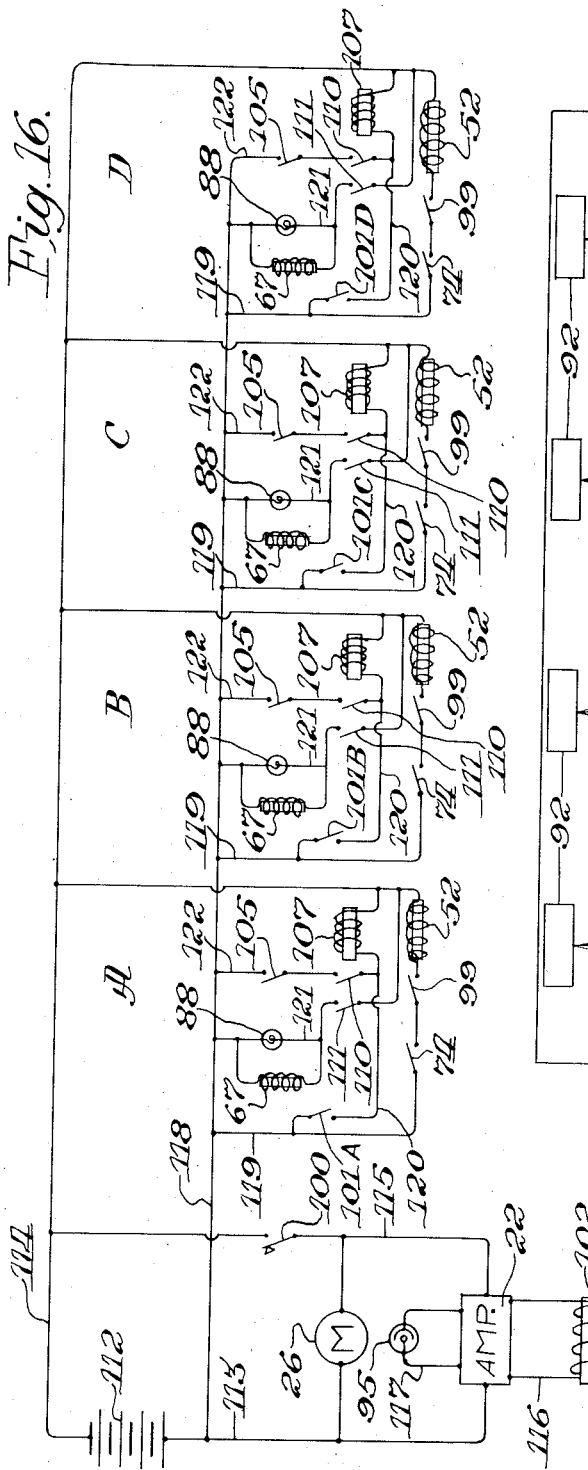

Patented Apr. 9, 1940

2,196,730

UNITED STATES PATENT OFFICE 2,196,730

FILM PLAYING PHONOGRAPH

Donald E. Hooker, Chicago, Ill., assignor to Raymond T. Moloney, Chicago, Ill.

Application May 17, 1938, Serial No. 208,427

22 Claims. (Cl. 179—100.3)

The invention relates to a film playing phonograph in which reels of film are respectively provided with sound tracks positioned with respect to a light source and lens system to pass the light through the film to a photo-electric cell and sound amplifier unit to reproduce and play the sound so recorded on the film.

The main object of the invention is to utilize such system of sound reproduction in a phonograph structure containing a plurality of sound film carrying reels and to make possible the selection of any one of the reels for reproduction or playing.

Another object is to provide such a phonograph in which compactness of arrangement and film reel storage is achieved.

Still another object is to provide the reels in unit groups with but a single photo cell taking the light from any film in a certain group, whereby one photo cell is made to serve a plurality of films in a given group.

Another object is to provide a novel structure for carrying and driving the reels and film from storage to take up reels, including manual reel selection means, and an automatic rewind action.

Still another object of the invention is to provide an improved electrical system for controlling the operation of the phonograph, the system to be such that after it has been manually initiated into operation the operations to be thereafter performed are entirely automatic.

Another object is to provide an improved phonograph preferably using 8 millimeter film with but a single sound track thereon.

Another object is to provide a constantly rotating drive shaft including friction drivers spaced to conform to the film reel spacing, with means to press the film of a selected reel into engagement with the corresponding driver to drive the film, said film being of the unperforated band type.

Another object is to provide a rewind mechanism operative from the main electric drive motor in such a manner that a reversible motor or an auxiliary rewind motor may be dispensed with.

Other important objects such as using a single light scanning device for all films in a unit group to achieve further compactness and simplicity are also of importance.

These, and other objects, are achievable by the form of the structure herein selected for purposes of illustration, wherein a suitable cabinet carries spaced horizontal shafts, an upper one being motor driven and having connections reversely to drive for rewind any selected one of a number of film carrying reels arranged on an axis parallel to the main drive shaft. Below the reels is the film driver shaft also on a parallel axis, including friction drivers into engagement with which respectively any film may be placed depending upon the selection to be made by the operator. Below this driver shaft is the shaft carrying the film take up reels. A light source is provided for each film but a single scanning slit and photo-electric cell is made to serve all films in a unit group. An electric motor serves as the driving power and an amplifier is associated with the cell to reproduce the sound in a speaker unit. An electric control circuit is included in the organization which is manually closed by the operator, as by a coin released switch, to start the motor; thereafter a manual film selector switch is closed; and after that all operations such as rewind and restoring all parts to an initial starting position are automatically effected by the movement of the selected film itself.

So much will suffice for the present in giving a general understanding of the structure of the invention, one illustrative, but practicable example of which is shown in the accompanying sheets of drawings, wherein:

Figure 2 is a side view, on a smaller scale of the film handling mechanism taken along the line 2—2 of Figure 6, looking in the direction of the arrows;

Figure 3 is an enlarged detail side view of the mechanism used to engage a film with the driver, said mechanism being that shown in Figure 2, but in film drive engaging position;

Figure 4 is a detail sectional view of a photo-electric cell taken along the line 4—4 of Figure 12 looking in the indicated direction;

Figure 5 is an enlarged detail, elevational view of a scanning slit used with a photo-electric cell taken along the line 5—5 of Figure 2;

Figure 16 is a typical electrical control wiring diagram for a unit group of four films; and, Figure 17 is a top plan schematic view of a phonograph layout using four groups of four films each to illustrate a commercial adaptation of the structure of this invention.

Figure 1:
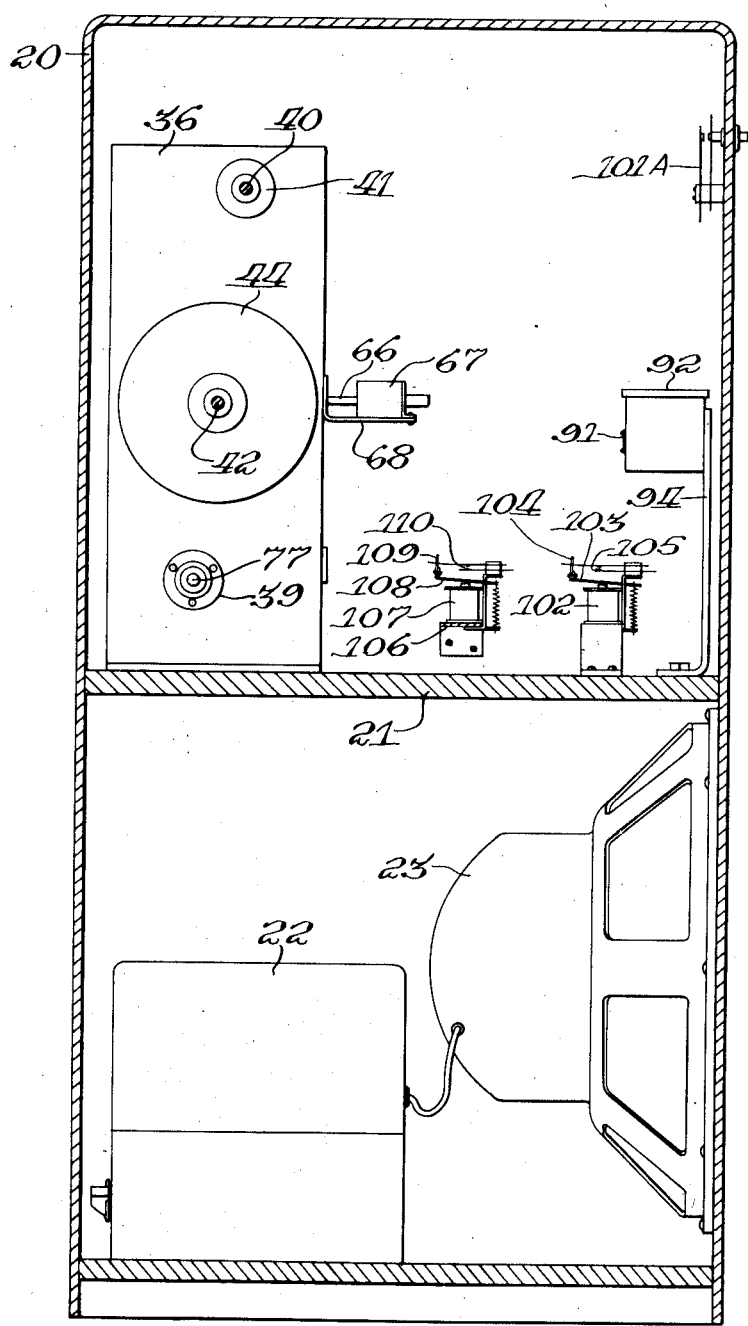
Figure 1 is a general side elevational view of the phonograph organization taken along the line 1—1 of Figure 9 looking in the direction of the arrows.

Any suitable form of cabinet 20 may be used having a horizontal floor 21 carrying thereabove the phonograph film reel handling mechanism of this invention, and therebelow the amplifier unit 22 and a connected speaker unit 23.

In the compartment above said floor 21 a side wall of the cabinet carries an upper shelf 24 and a lower shelf 25, the upper one carrying an ordinary electric motor 26 having a shaft and coupler 27 for driving a set of reduction gears, not shown, and enclosed in a case 28 carried on said shelf. Extending directly from said case is a horizontal driven shaft 29 carrying a bevel gear 30 meshing a bevel gear 31 fast on a vertical shaft 32, which extends downwardly and carries a bevel gear 33 meshing a mating gear 34 on a horizontal shaft 35. The shafts 32 and 35 are suitably journaled in a bracket 36' mounted on the lower bracket or shelf 25. The shafts 29 and 35, because of the gearing described, will always rotate in opposite directions.

Figure 11:
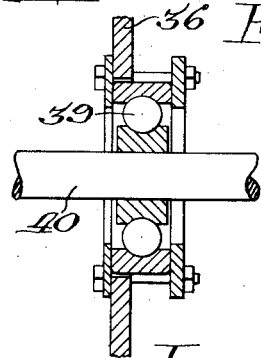
Figure 11 is an enlarged cross sectional view of a type of bearing used in the organization, taken along the line 11—11 of Figure 9 looking in the direction indicated.

The floor 21 carries a frame work comprising vertical, spaced side plates 36 suitably cross braced by a lower horizontal plate 37 and an upper plate 38. Journaled at opposite ends in the sides 36 by means of anti-friction bearings 39 (see Figures 9 and 11) is a horizontal shaft 40 connected by couplers 41 to the shaft 29. The shaft 40 is known as the film rewind shaft.

It should be kept in mind, for the sake of preventing unnecessary duplication, that in the main figures, only one unit group of four films is being described and shown. By means of similar bearings 39 the sides 36 carry another horizontal shaft 42 parallel with the rewind shaft and to be known as the film driver shaft, said shaft 42 by means of a coupler 43 being coaxially connected to the shaft 35. A fly wheel 44 may be made fast on said shaft 42. The shafts 40 and 42 turn in opposite directions.

Figure 7:
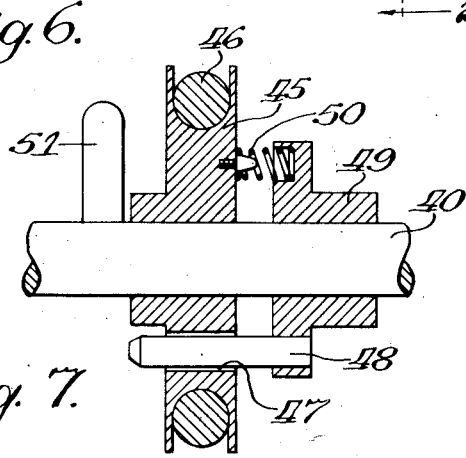
Figure 7 is an enlarged detail view of a clutch taken in section along the line 7—7 of Figure 8.
Figure 8:
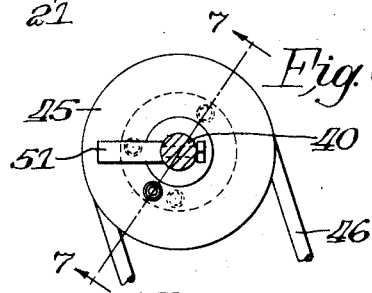
Figure 8 is a face view of the same clutch on a reduced scale, taken along line 8—8 of Figure 6, looking in the indicated direction.

The shaft 40, in spaced relationship, carries four pulley wheels 45, each constructed as shown in Figure 7, with a belt 46 trained therearound. Each pulley is loose on the shaft and has a transverse bore 47 through which is passed a pin 48 carried on a block 49 carried for sliding movement on the shaft 40. Between each pulley 45 and each block is one or more light springs 50 (see also Figure 8) normally to keep the blocks moved over to such an extent that the pin 48 is withdrawn from the path of movement of a radial driven pin 51 made fast to turn with the shaft 40 adjacent each pulley 45. It will be understood that in a unit of four films there will be four such pulley units as shown in Figure 7, one for each film.

Figure 9:
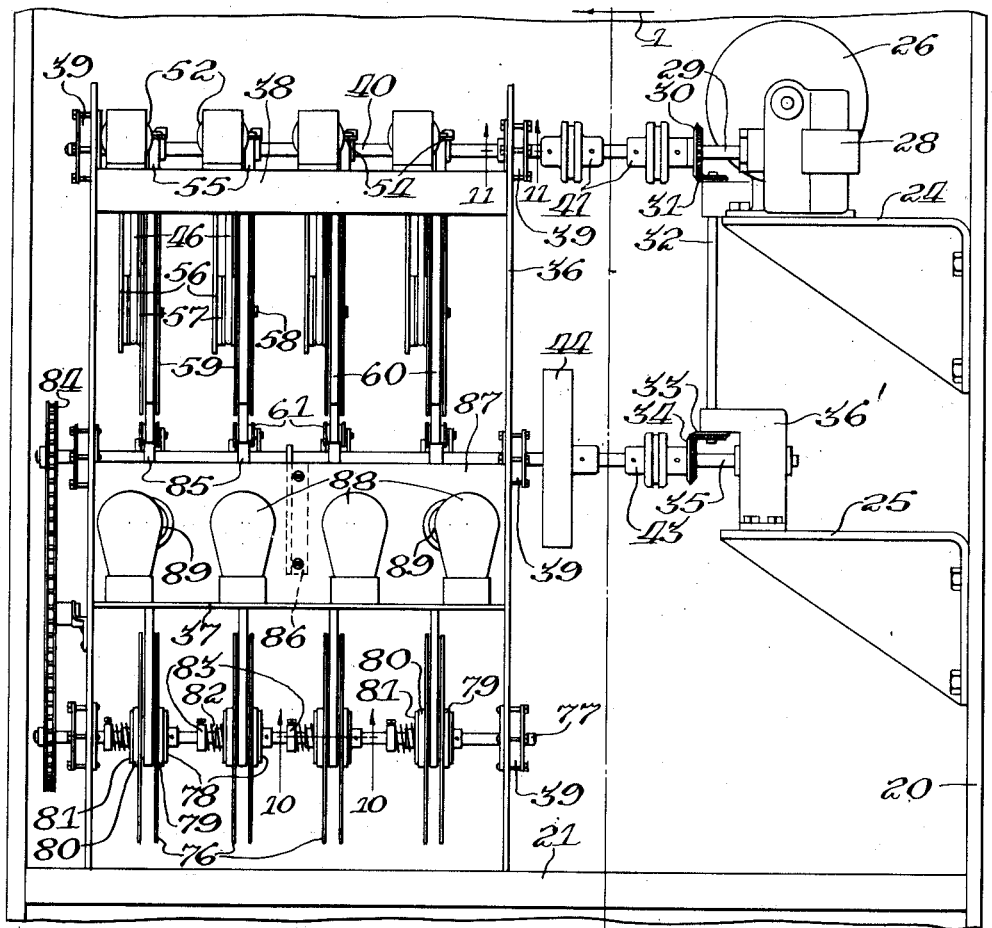
Figure 9 is a rear elevational view of the mechanism with the near wall removed to expose the parts.

Looking at Figures 2 and 9 it will be seen that the plate 38 carries four spaced electromagnetic devices, such as solenoids 52 (see also Figure 6) each of which has a movable armature 53 to operate a pivotally mounted bell crank lever 54 carried by a pin 55 on the plate 38. One end of each bell crank lever, it will be seen, is positioned to engage and shift the proximate block 49 to move its pin 48 into position to be engaged by the drive pin 51. In this manner any pulley 45 can be made to turn with the shaft 40 so long as the corresponding solenoid 52 remains energized.

The plate 38 further carries four depending brackets 56 each of which carries a pulley wheel 57 integral and turnable on a shaft 58, carried by the brackets, with a film carrying reel 59. The belts 46 are connected between the pairs of pulleys 45 and 57 in an obvious manner. It will be understood that the reels 59 and their associated pulleys 57 are loose on the shafts 58, which shafts on all four brackets 56 are axially alined.

The four films are numbered 60 and each has one end permanently secured to its reel 59, the films being then threaded behind idlers 61 (see Figures 2 and 3) respectively on film driver engaging mechanisms now to be described.

Figure 13:
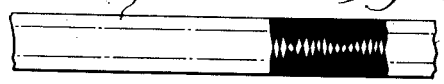
Figure 13 is a detail view of a portion of film with sound track recording shown thereon.

A bracket plate 62 is carried between the end plates 36, the same carrying a spring pulled lever 63 on which the rollers 61 are respectively mounted. It will be understood there are four film engaging mechanisms of the type now being described, one for each film in each unit of four films. Each mechanism includes a slidably guided member 64 carried on a bracket 65, as shown, each member having connected to it a push pull link 66 operable as the core of a solenoid 67 carried on a bracket 68 supported in any suitable manner, as shown. The inner end of the member 64 is bifurcated to carry two vertically spaced idler rollers 69 over which the film 60 is trained. This film which is not perforated and therefore of the sprocketless type, may be of standard 8 millimeter size, if desired, and as shown in Figure 13 has a single sound track recorded thereon. Each film 60 is then trained around another guide roller 70, four of which are loosely mounted on a small transverse shaft 71 carried in the frame-work 36.

Figure 15:
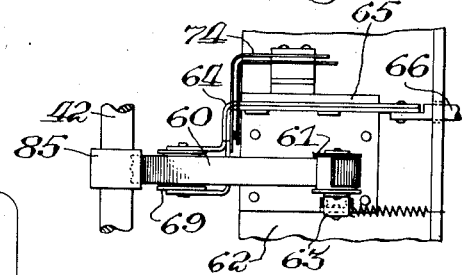
Figure 15 is a detail plan view of a film drive engaging device as viewed from the line 15—15 of Figure 2.

The plate 62 carries four depending brackets 72, each of which carries a projection lens 73, as shown. Each bracket 65 (see also Figure 15) carries in a properly insulated manner, a normally open spring blade contact switch 74.

The films 60 are then respectively trained around suitably mounted, respective spring tensioned tightener idlers 75 and finally the other, or lower end of each film is respectively secured to a take up reel 76. These four reels as seen in Figure 10 are loose on a shaft 77 disposed transversely and having its ends journaled in bearings 39 in the sides 36 in the manner previously described.

Figure 10:
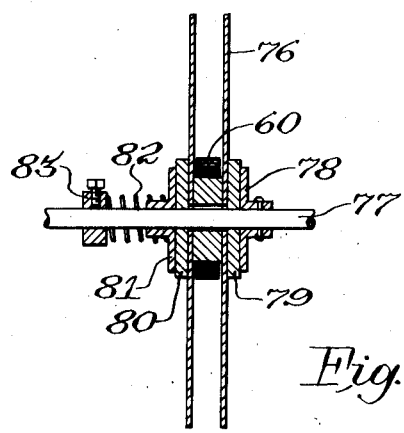
Figure 10 is an enlarged cross sectional view through a take up reel taken along the line 10—10 of Figure 9 looking in the direction indicated.

Looking at Figure 10 it will be seen that fast on the shaft 77 adjacent each take up reel 76 is a collar 78 with a felt or friction washer 79 clamped between the collar and reel. On the opposite face of each reel is another washer 80, slidable collar 81 and a coil spring 82 surrounding the shaft 77 and thrusting from a block 83 to clamp the friction inserts 79 and 80 into driving engagement with the reels. The shaft 77 may be termed the take up reel shaft, the same being driven from one end, as shown in Figure 9, by a sprocket chain drive 84 from the film driver shaft 42 heretofore mentioned. This shaft 42 carries fast thereon, four spaced, small friction driver wheels 85, so that when a film 60 is pressed and held against one of said wheels 85 the film will be frictionally driven. No sprocket film drive is used, thus saving the film from damage.

The shaft 42 at its center is additionally journaled in a bracket 86 as seen in Figure 2, said bracket being secured to an upstanding part 87 of the cross plate 37. This plate 37 carries four spaced electric lamps 88 serving as light sources for the four respective films. The part 87 is immediately in front of these lamps 88 and carries for each lamp a light condenser lens 89 which serve to condense the light coming from the lamps and direct it through the four projector lenses 73 heretofore described. Thus for each of the four films in the unit group is a lamp 88, a condenser lens 89 and a projector lens 73.

Figure 12:
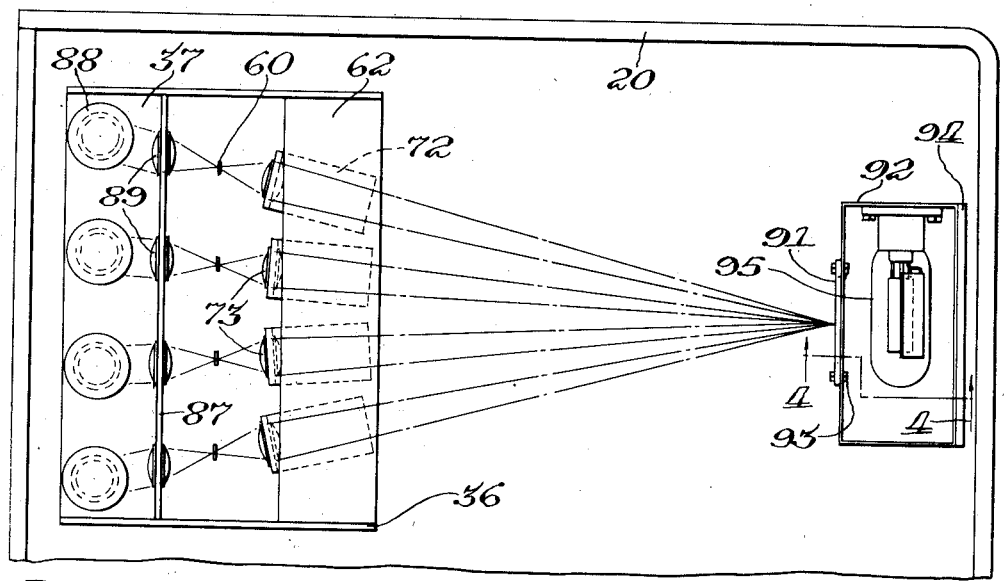
Figure 12 is a schematic plan view of a film projection group illustrating the lens system by which a single photo-electric cell is made to serve a unit group of films.

The light is thus passed through a film 60 as shown in Figure 2 and directed through a scanning slit 90 (see Figures 2 and 5) formed by two horizontal spaced apart plates 91 mounted on a box 92. The plates 91 are positioned for adjustment by means 93 so that the width of the slit may be adjusted as desired. The box 92 is carried on a support 94 and houses a photo-electric cell 95 (see also Figure 4). One photo-electric cell takes the light from all four lamps 88 in a group of four, which result is achieved by the arrangement shown in Figure 12, where it will be seen that while the lamps 88 and lenses 89 are in transverse parallel rows, and the films 60 likewise, nevertheless the projector lenses 73 are spaced in an arc along respective radial lines so that the light rays coming from the lamps 88 will all be concentrated at the radial point at the center of the scanning slit 90. By this arrangement unusual simplicity and compactness is achieved.

Associated with each take up reel 76 is a suitably mounted, pivoted lever 96 as shown in Figure 2, each said lever having its inner end extending into a corresponding reel 76, where it carries a small roller 97 held in engagement with the reel of film, as shown. The other end of the levers 96 are formed to engage an upstanding insulated pin 98 carried rigidly on one blade of a double blade spring contact switch 99 suitably mounted, as indicated. There will be one such lever 96 and switch 99 associated with each take up reel 76.

Figure 6:
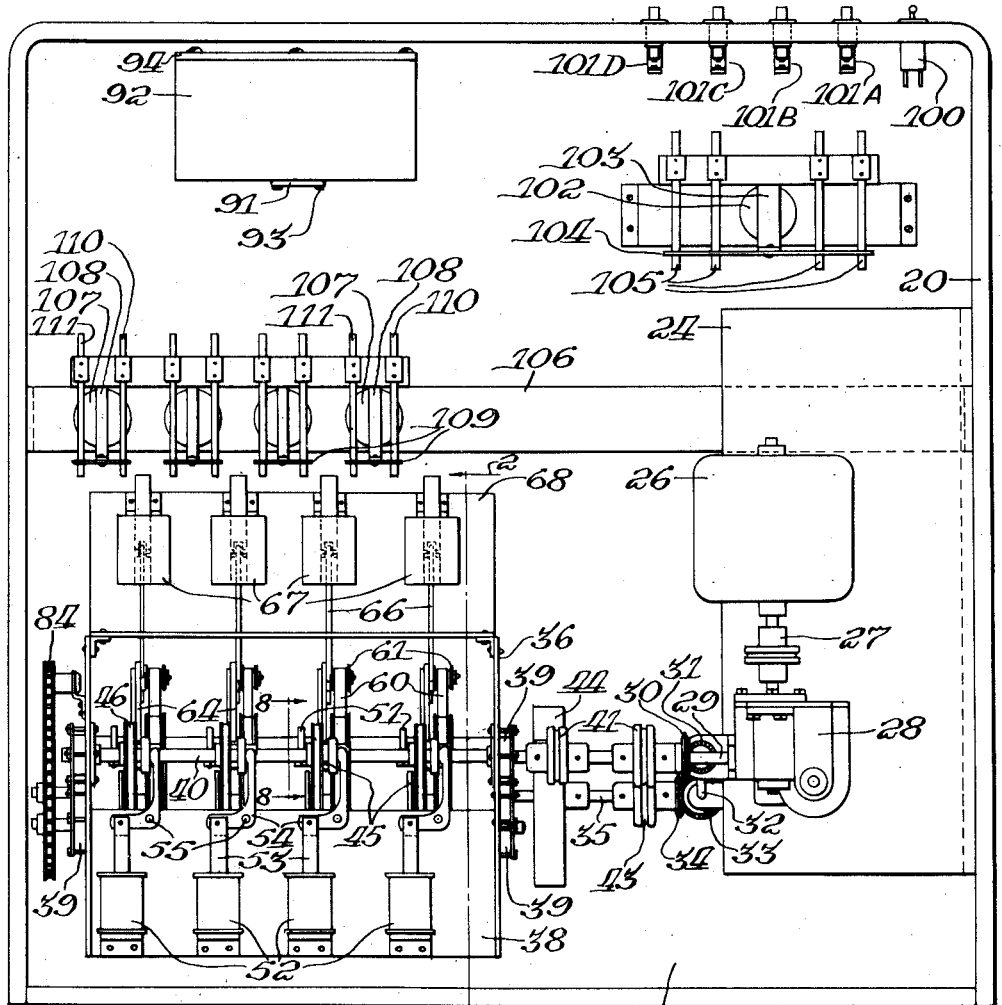
Figure 6 shows a plan view of the phonograph with the top removed to expose the interior mechanism, there having been shown for sake of simplification only one unit group of four films.
Figure 14:
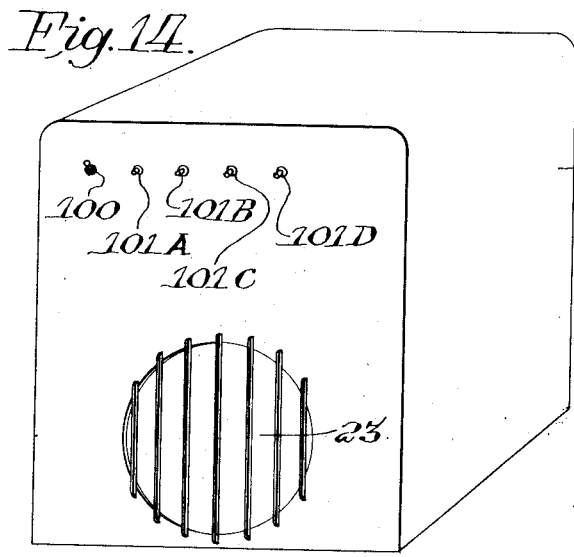
Figure 14 is a perspective view of an illustrative form of cabinet for the phonograph with the speaker, and manual control switches shown thereon.

Carried on the cabinet 20 as shown in Figures 6 and 14 is a manually controlled starting toggle switch 100 and four manual push button selector switches 101A; 101B; 101C; and 101D, one for each film in a group of four.

The floor of the cabinet as seen in Figures 2 and 6 carries a single magnetic relay 102 having an armature 103 which is spring pulled and pivoted as shown. The armature is provided with an upstanding slotted extension 104 through which is passed the free end of a blade in each of four spring blade contact switches 105.

The side walls of the cabinet carry a cross plate 106 on which is carried four spaced electromagnetic relays 107 each provided with a spring pulled pivoted armature 108 carrying a slotted upstanding part 109 through which is passed one blade of a respective spring blade contact switch 110. Thus, for each of the four films is one of these electromagnetic controls. A switch 111 is provided for each film to control the energization of the corresponding solenoid 67 and lamp 88. A source of energy is indicated in Figure 16 at 112.

In Figure 17 the schematic showing illustrates how four groups of four films each may be arranged in a cabinet; thus, in such commercial form giving the operator sixteen film records available for selection and playing. Of course, it is to be understood that a selector button switch will be required for each film and the electrical control system diagrammed in Figure 16 will have to be suitably augmented in a manner available to those skilled in the art to accommodate the sixteen films.

In the diagram of Figure 16 a wire 113 leads from the positive side of the battery to the amplifier 22. A wire 114 leads from the negative side of the battery and a wire 115 goes from the amplifier 22 to said wire 114. The motor 26 is in a cross circuit between the wires 113 and 115. A shunt circuit 116 from the amplifier 22 includes the device 102, and the master toggle switch 100 is in the wire 115. Another shunt circuit 117 includes the photo-electric cell 95. Closing the switch 100 will cause the motor 26, cell 95 and amplifier 22 to be energized. A wire 118 runs from the positive side of the battery, as shown and connected with the two wires 114 and 118 are all control circuits for each film in a group of four films.

The four film control circuit groups are labelled A, B, C and D. Each group has a wire 119 leading from wire 118 to wire 114. In each wire 119 is a switch 75 and a switch 99 as well as a solenoid 52, which parts were previously described. A cross wire 120 is in the circuit wire 119 and includes a selector switch 101A, B, C or D in the groups; and also the solenoid 107. A lamp circuit wire 121 including a lamp 88 connects between wire 118 and wire 119, said wire 121 including a switch 111. The solenoid 67 is in the lamp circuit just described. A wire 122 connects between wire 120 and wire 118 and includes a switch 105 and a switch 110. Each of the four circuit groups A, B, C and D is the same.

In operating the phonograph a group of four reels 59, respectively carrying a sound film, is carried on the shafts 58. The shaft 49 is turning when the motor runs but the reels do not turn since they are connected by belts 46 with normally loose pulleys 45 on the rewind shaft 40. All switches of course are open at the beginning and the films have opposite ends secured to reels 59 and take up reels 76 with the film threaded over the idlers 69 of the engaging unit 64 which is in inoperative position, as seen in Figure 2.

To start the reproduction of sound the operator closes toggle switch 100 thus starting the motor 26, amplifier 22 and turning on the photo electric cell 95. Let us assume the film corresponding to group A is selected. Accordingly, switch 101A is closed energizing the corresponding relay 107 and through armature 108 closes switch 110 and switch 111. Switch 111 closes the light circuit 121 to light the lamp 88 and also through the coil or solenoid 67 moves the film engaging device 64 from the position thereof shown in Figure 2 to the position shown in Figure 3. Since the shaft 42 and friction rollers 85 are always turning clockwise as shown in these two figures the film 60 is driven downwardly. Since the take up shaft 77 turns in the same direction by means of the chain drive 84 the corresponding take up reel 76 for the selected film being driven takes up the film as it is reeled thereon. Only the reel 76 turns whose film is being frictionally driven on to it.

The switch 101A must be held closed long enough for the film leader to run off and until the light from the corresponding lamp 88 begins to pass through the sound track and light ray variations are thus created. When this happens the relay 102 is energized from the amplifier 22 causing the switch 105 for group A to close by means of the closer 104 shown in Figure 6. With switch 105 closed automatically, manual selector switch 101A need no longer be held closed. Thus a circuit through relay 107, switch 110, switch 105 is completed to keep relay 107 energized to hold the film driver in engagement. The film A thus selected will continue to be driven and played due to the fact that relay 102 remains closed so long as sound track is available for light variations to pass therethrough. Thus it is the relay 102 operable by light variations that serves to keep the switch 105 closed.

As soon as the sound stops the relay 102 is deenergized and switch 105 opens, breaking the circuit through coil 67 and lamp 88. Solenoid 107 is, of course, also deenergized and retracts the film engaging mechanism 64 to the position shown in Figure 2 and as a result the friction roller 85 can no longer drive the film A since it is not taut. When the part 64 retracts, it closes a switch 75. At this same instant the switch 99 is closed by the control lever 96 in an obvious manner. Consequently a circuit is closed to energize the corresponding rewind solenoid 52. As a result the block 49 is shifted on the shaft 40 (see Figure 7) to cause a pin 51 with the shaft to drive the rewind pulley 45 which drives the belt 46 and pulley 57 associated with the reel 53 for driving said reel 53 reversely to rewind the film A. When the film being rewound has left the take up reel 76 the switch 99, of course, opens in an obvious manner breaking the circuit to coil 52. Consequently the whole circuit is open, all parts are released, and everything is back or set in its original starting position. The switch 100 may be opened in any desired manner to stop the motor 26.

The B, C, and D film circuits are the same as the A circuits described and as appears from Figure 16 operate identically.

From this disclosure it can now be seen that an improved film playing phonograph has been provided which achieves the objects of the invention as heretofore recited.

It is the intention to cover all changes and modifications of the illustrative example shown which do not in material respects constitute departures from the spirit and scope of the invention.

What is claimed is:

1. A film playing phonograph comprising a support carrying a plurality of separate sound track films disposed in spaced relation, each film including a set of reels individually therefor and means to drive the film, means for selectively driving one film at a time, a lens system including a separate light source for each film, and means including a common scanning slit and a single photo electric cell for all said lens systems to receive light variations coming from any selected film.

2. A film playing phonograph comprising a set of separate sound track films carried in the phonograph in spaced relation, means to select any film in the set and move it through a beam of light, a separate light source for each film, a separate lens system for each film and light source, and a common photo electric cell for receiving light from any of the light sources for said films.

3. A film playing phonograph comprising a set of separate sound track films carried in the phonograph in spaced relation, means to select any film in the set and move it through a beam of light, a separate light source for each film, a separate lens system for each film and light source, a photo electric cell common to all said light sources to receive light variations passing through the selected film, and means for automatically lighting the light source for the selected film at the time such film is selected.

4. A film playing phonograph comprising a set of separate sound track films carried in the phonograph in spaced relation, means to select any film in the set and move it through a beam of light, a separate light source for each film, a separate lens system for each film and light source, a common photo electric cell for receiving light from any of the light sources for said films, an amplifier associated with the cell, means for automatically turning on the light source for the selected film when the selection is made, and means whereby the amplifier is energized when light variations pass through the sound track of the film to the cell.

5. A film playing phonograph comprising a support carrying a plurality of sound track film reel sets in spaced relation, manually controlled means for selecting a film of one set to be operated, power means to drive the film so selected, a separate light source and lens system for each film, a photo electric cell to receive light variations from the selected film, and means for automatically turning on the light source for the selected film and energizing the cell when the film is selected.

6. A film playing phonograph comprising a support carrying a plurality of sound track films, a set of reels for each film, an electric motor, means driven from the motor to drive each of the films as selected, electro-magnetic means including circuits whereby an operator may select any one of the films to be played, a light source and lens system for each film, photoelectric cell means to receive light variations from the films, and an amplifier and speaker associated with the cell.

7. A film playing phonograph comprising a support carrying a plurality of sound track films, a set of reels for each film, means for individually and selectively driving each film, a separate light source for each film, a separate lens system for each film, and a common photoelectric cell to receive light passed from the light sources and lens systems through any of said films.

8. A film playing phonograph comprising a support carrying a plurality of sound track films, a set of reels for each film, means for individually and selectively driving each film, a light source for the films, a lens system for the films, and a photoelectric cell to receive light from the source passed through any film to the photoelectric cell.

9. A film playing phonograph comprising support means, sound track film reel sets arranged in groups on the support means, means to drive selectively the film in any group, a source of light for each film, a lens system for each film, and a photoelectric cell respectively provided for each group to receive light passed through any selected film.

10. A film playing phonograph comprising support means, sound track film reel sets arranged in groups on the support means, means to drive selectively the film in any group, a lens system including a light source for each film, and photoelectric cells to receive light variations passed through the films, each cell being common to the number of films in a group.

11. In a film playing phonograph, a support, a group of separate sound track films and means for respectively carrying same on the support, an electric motor including means to drive the films, means to select any film for operation, a light source and lens system for each film, a photoelectric cell to receive light variations from the selected film, an amplifier operable from the cell, circuits including the motor, light sources cell and amplifier, and automatically operable means to maintain the circuits operative while light variations pass through the film.

12. In a film playing phonograph, a group of separate sound track films including respective sets of storage and take up reels for each film, a supported shaft structure to carry all storage reels on a common axis, a supported shaft to carry all take up reels on a common axis, a driver shaft carrying friction wheels respectively positioned adjacent the films between the aforementioned axes, means for each film for engaging a film with a friction wheel, a light source and lens system individual for each of the films, and a common photoelectric cell positioned to receive light variations coming from any selected film of the group.

13. In a film playing phonograph, a group of separate sound track films including respective sets of storage and take up reels for each film, a supported shaft structure to carry all storage reels on a common axis, a supported shaft to carry all take up reels on a common axis, a driver shaft carrying friction wheels respectively positioned adjacent the films between the aforementioned axes, means for each film for engaging a film with a friction wheel, said engaging means being electromagnetically operable and including a circuit with a source of energy and a manual selector switch, a light source and lens system for the films, and a photoelectric cell positioned to receive light variations from the selected film.

14. In a film playing phonograph, a group of separate sound track films including respective sets of storage and take up reels for each film, a supported shaft structure to carry all storage reels on a common axis, a supported shaft to carry all take up reels on a common axis, a driver shaft carrying friction wheels respectively positioned adjacent the films between the aforementioned axes, means for each film for engaging a film with a friction wheel, a light source and lens system individual for each of the films, a common photoelectric cell positioned to receive light variations from any selected driven film, automatically acting means to disengage the film engaging means when the film is wound on the take up reel, and means for automatically rewinding the said film on the storage reel therefor.

15. In a film playing phonograph, a support, pairs of reels arranged in a group on the support and each pair of reels in the group carrying a separate sound track film, an individual light source for each film, means to move a selected film through a beam of light from its associated light source, a condenser lens and projector lens on opposite sides of each film, and a single photo electric cell and scanner, said projector lenses being positioned in spaced relation along substantially an arc whereby light variations from any film are concentrated through the scanner and photo electric cell which is common to all films.

16. In a film playing phonograph, a support, pairs of reels arranged in a group on the support and each pair of reels carrying a sound track film, means to drive the films through a beam of light, an individual light source for each film, means to select any one film to be driven, means to turn on the light source individual to the selected film, an individual optical system for each film, and means to convert light variations from the film into sound comprising a photo electric cell and amplifier.

17. In a film playing phonograph, a support, pairs of reels arranged in a group on the support and each pair of reels carrying a sound track film, manually initiated automatically acting means to select and drive one of the films through a beam of light, an individual light source and optical system for each film, and means for converting light variations passing through the driven film into sound.

18. In a film playing phonograph, a support, pairs of reels arranged in a group on the support and each pair of reels carrying a sound track film, manually initiated automatically acting means to select and drive one of the films through a beam of light, an individual light source and otical system for each film, and means for converting light variations passing through a driven film into sound, said last named means including a single photo electric cell positioned to receive light variations from any of the optical systems and films in said group.

19. In a film playing phonograph, a support carrying a set of storage reels on one axis, a set of take up reels on a parallel axis, said reels arranged in complementary pairs and each pair carrying a sound track film, an auxiliary support disposed between the aforementioned two axes and provided with friction drivers respectively for each film, individual movable means on the auxiliary support including rollers respectively carrying a film run in position respectively adjacent a friction driver, means to move a selected film into engagement with its driver by moving the associated movable means, an individual optical system and light source for each film, and a photo cell to receive light variations from the film for conversion into sound.

20. In a film playing phonograph, a support carrying a set of storage reels on one axis, a set of take up reels on a parallel axis, said reels arranged in complementary pairs and each pair carrying a sound track film, an auxiliary support disposed between the aforementioned two axes, a turning shaft positioned between said axes and provided with friction drivers respectively for each film, individual movable means on the auxiliary support including rollers respectively carrying a film run in positions respectively adjacent a friction driver, electromagnetic means individual to each film to move an associated selected film into engagement with its driver by moving the associated movable means, an individual optical system and light source for each film, and a common photo cell positioned to receive light variations severally from a number of the films for conversion into sound.

21. In a film playing phonograph, an upright frame carrying spaced parallel horizontal shafts, one shaft carrying storage reels and the other take up reels, with the reels arranged in complementary pairs, each pair carrying a sound track film, a support between the shafts carrying individual movably mounted means each carrying the run of a respective film, a parallel driver shaft between the reel shafts and means thereon to be engaged by the film runs aforesaid when the movable means moves same into engagement therewith to drive a selected film, means to move said movable means for the purpose stated, an optical system and light source for the films, and a photo cell to receive light variations from the films for conversion into sound.

22. In a film playing phonograph, a support, a spaced series of lamps on the support, an optical system for each lamp including projection lenses arranged angularly relative to one another to concentrate all light from any lamp at a common point, means to move sound films respectively through each optical system, and a photo cell including a scanning slit positioned at the aforesaid common point.

DONALD E. HOOKER.